United States Patent [19]

Roger

[11] 4,197,867
[45] Apr. 15, 1980

[54] RELAY INDICATOR VALVE

[76] Inventor: Harry Roger, 124 Bank St., Lafayette, La. 70506

[21] Appl. No.: 863,430

[22] Filed: Dec. 23, 1977

[51] Int. Cl.² .................... F17D 3/00; F16K 17/164
[52] U.S. Cl. ........................................ 137/1; 137/456; 251/26
[58] Field of Search .......................... 137/456, 458, 1; 251/26

[56] References Cited

U.S. PATENT DOCUMENTS

| 312,724 | 2/1885 | Jarboe | 137/456 |
|---|---|---|---|
| 3,877,484 | 4/1975 | Theriot et al. | 137/458 |
| 3,963,050 | 6/1976 | Theriot et al. | 137/458 |

*Primary Examiner*—Martin P. Schwadron
*Assistant Examiner*—G. L. Walton
*Attorney, Agent, or Firm*—Guy E. Matthews

[57] ABSTRACT

A pneumatic relay valve is actuated by a pressure differential determined by the respective surface areas of two opposing surfaces of a piston moveable within the valve body. A first pressure (pilot signal) to be monitored maintains the piston member of the valve in its "in-service" position, blocking all ports in the valve body. Upon the occurrence of a sufficient pilot signal pressure drop, a second continuous common supply pressure moves the piston to a "tripped" position, sealing off the pilot signal inlet port to enable the second (common supply) pressure to bleed to the atmosphere. This sudden loss of common supply pressure causes a common supply relay valve to "trip," closing off all common supply fluid pressures to each of a plurality of first relay valves. Only upon reinstatement of the first interrupted pilot signal pressure may the relay valve be manually reset to the "in-service" position and maintained in that position by sufficient pilot signal pressure.

6 Claims, 3 Drawing Figures

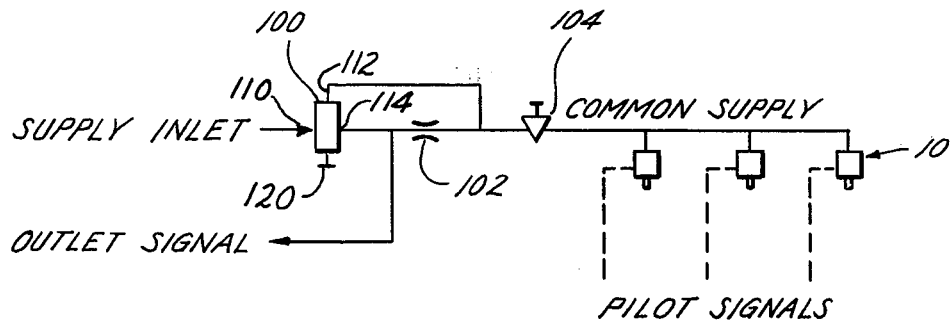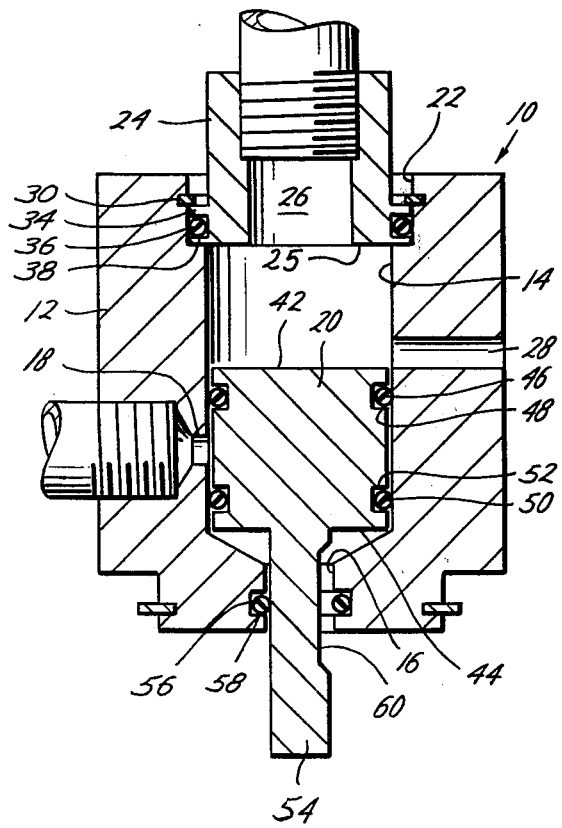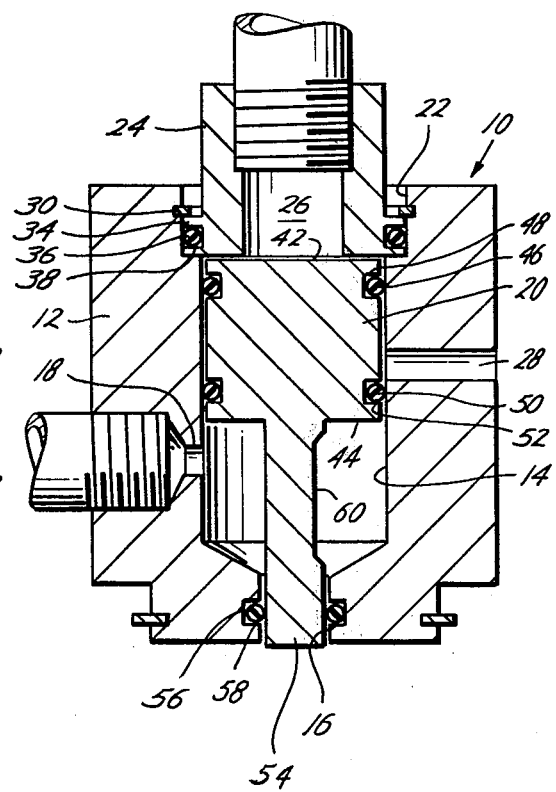

RELAY INDICATOR VALVE

FIELD OF THE INVENTION

This invention relates generally to a pneumatic relay type valve that is used to identify and indicate drops in pressure below a pre-determined minimum and more particularly concerns a relay valve operated by a pressure differential pre-determined by the respective surface areas of two opposing surfaces of a piston moveable within said valve body such that a pressure drop will "trip" the relay, indicating which of several pressure sources has diminished, and will remain "tripped" until both the pressure is reinstated and the relay valve is manually reset to its "in-service" position.

Pneumatic control devices are well known in the art as identified by U.S. Pat. Nos. 3,877,484 to Theroit, 2,667,896 to Kanuch, and 2,664,101 to Cano, which depict various types of relays or control valves using either a pressure or a pressure differential to maintain a desired condition. The most common type of pneumatic control device used on offshore oil and gas production today is the "block and bleed" type. When an abnormal condition occurs (high or low pressure, high or low liquid level, etc.), the device blocks (closes) the pneumatic inlet supply (pilot signal) and bleeds the outlet supply (common supply).

The other type of device used is the "venting" or normally open type. When an abnormal condition occurs, the device opens, "outrunning" an orifice (or choke) causing a loss of pneumatic supply (common supply), hopefully sufficient to "trip" another control (relay) valve.

In the prior art and to accomplish the desired results, pneumatic pressure sensors had to be used in conjunction with separate pneumatic indicator relays and, in addition, a normally open valve with sufficient bleed area had to be added to the system in order for the relay to "trip."

The present invention herein serves both as a pressure sensor which functions to close the pneumatic inlet supply (pilot signal) and bleed the outlet supply (common supply) and also identifies and indicates the source of the abnormal condition.

SUMMARY OF THE INVENTION

A plurality of relay/indicator valves is used in a system to monitor independently a plurality of pilot signal pressures from a corresponding plurality of control points. A common supply pressure is exposed to one surface of a piston moveable within said relay/indicator valve. With the moveable piston in an "in-service" position, the pilot signal pressure is exposed to an opposing smaller surface on the piston member opposite the first surface. With sufficient pilot signal pressure maintained, the piston member remains in the "in-service" position; however upon the occurrence of a pre-determined minimum or lower pilot signal pressure, the common supply pressure acting on the larger piston surface moves the piston to a "tripped" position, sealing off the pilot signal port and allowing the common supply pressure to freely bleed to the atmosphere via a common supply bleed port. The piston member also has a stem which, when in the "tripped" position, extends from the valve body indicating which pilot signal pressure has been interrupted.

The sudden loss of common supply pressure will "trip" a second relay valve which provides common supply pressure to each of the plurality of relay/indicator valves, terminating the supply inlet pressure to the said relay/indicator valves.

When the abnormal condition causing the loss in pilot signal pressure is corrected and the pressure is reinstated, the relay/indicator valve may be manually reset to its "in-service" position, and maintenance of the pilot signal pressure will retain the valve piston in the "in-service" position. At this time, the second relay valve may be reset, reinstating the common supply pressure to each of the plurality of relay/indicator valves.

BRIEF DESCRIPTION OF THE DRAWINGS

Other objects and advantages of the invention will become apparent upon reading the following detailed description and upon reference to the following drawings, which drawings form a part of this specification.

FIG. 1 is a cross-sectional view showing the piston member in the "in-service" position.

FIG. 2 is a similar cross-sectional view to FIG. 1 with the piston member being in the "tripped" position.

FIG. 3 is a schematic of a typical application using three relay/indicator valves.

DESCRIPTION OF THE PREFERRED EMBODIMENT

Referring to FIG. 1, a relay/indicator valve, generally referred to as 10, is shown in the first or "in-service" position. The relay/indicator valve 10 comprises a valve body 12 having a cylindrical bore 14 which slideably receives a valve piston 20. At one end of the body 12 and concentric with the cylindrical bore 14 is a smaller cylindrical bore 16 which serves as a residual pressure relief port in communication with the cylindrical bore 14. A pilot signal port 18 communicates with the cylindrical bore 14 at a location in close proximity with the residual pressure relief port 16. At the opposite end of the cylindrical bore 14 from the residual pressure relief port 16 is a third cylindrical bore 22 concentric with the first cylindrical bore 14. This third concentric cylindrical bore 22 removeably receives an inlet nipple 24 having an interior surface 25, containing a common supply pressure port 26 in communication with the central cylindrical bore 14. A common supply bleed port 28 communicates with the central cylindrical bore 14 at a location between the points of communication of the pilot signal port 18 and the common supply pressure port 26 with the central cylindrical bore 14. The inlet nipple 24 is held securely, yet removeably, in place by the action of a retainer ring 30, recessed in a retainer ring groove 32 cut into and otherwise part of the cylindrical wall of the third cylindrical bore 22 of the valve body 12 the re-retainer ring, acting on an annular ring 34 of the inlet nipple 24 to retain the nipple in place. Pressure is maintained between the mating surfaces of the inlet nipple 24 and the valve body 12 by means of a O-ring 36 disposed in an annular O-ring groove 38 of the inlet nipple 24.

The moveable piston 20 positioned within the bore 14 includes a piston front surface 42 exposed to the common supply pressure port 26. Opposite the piston's front surface 42 is a piston rear surface 44 of a smaller surface area then the piston front surface 42. Pressure is maintained along the mating surfaces of the piston 20 and the central cylindrical bore 14 at the piston front surface 42 by means of an O-ring 46 positioned in an O-ring retainer groove 48 located along the circumference of the piston 20 adjacent the piston front surface 42. Similarly, pressure is maintained along the mating surfaces of the piston 20 and central cylindrical bore 14 at the piston's rear surface 44 by means of an identical O-ring 50 positioned in an O-ring retainer groove 52 located along the circumference of the piston 20 immediately interiorly of the piston rear surface 44.

Extending perpendicularly and outwardly from the geometric center of the piston rear surface 44 is a manipulating or operating stem 54, extending through the residual pressure relief port 16. Located in the valve body 12 in the area of the residual pressure relief port 16 is an O-ring 56 positioned inside an O-ring retainer groove 58, which serves to maintain pressure around the operating stem 54 and within the bore 14. As best shown in FIG. 2, the operating stem 54 includes a pressure relief cutout 60 to disengage the O-ring seal 56, allowing the pressure contained within the central cylindrical bore 14 to bleed to the atmosphere as the valve piston 20 moves from the first position as shown in FIG. 1 to the second position as shown in FIG. 2 as will be set forth hereinbelow.

As illustrated in the figures, pressure is maintained and prevented from leaking at the common supply pressure port 26 by the combined action of O-ring 36 and O-ring 46. Also with the valve piston member 20 in this position, pressure is maintained and prevented from leaking at the pilot signal pressure port 18 by the combined sealing action of O-ring 50 and O-ring 56. With the valve piston 20 in its "tripped" position, as shown in FIG. 2, any fluid pressure at the pilot signal pressure port 18 is maintained by the combined action of O-ring 46 and O-ring 50.

During typical operation, a continuous pressure, typically 25 psi, is supplied to the valve 10 at the common supply pressure port 26 of the inlet nipple 24. This common supply pressure acts on the front pressure surface 42 of the piston 20 and is sealingly maintained by the action of O-ring 36 and O-ring 46. A pilot signal pressure, typically 30 to 50 psi higher than the pressure on surface area 42, is supplied to the valve 10 at the pilot signal pressure port 18 and acts on the rear pressure surface 44 of the piston 20 to position the piston 20 as illustrated in FIG. 1, 20 in its "in-service" position. The pilot signal pressure is sealed within the valve 10 by the action of O-ring 50 and O-ring 56 as long as the valve piston 20 remains in the "in-service" position as depicted in FIG. 1. As illustrated, the rear pressure surface 44 is necessarily smaller than the front pressure surface 42, which necessitates a larger pilot signal pressure at port 18 than the common supply pressure at port 26 to retain the piston 20 in its "in-service" position.

As best shown in FIG. 1, as long as sufficient pilot signal pressure is maintained at the pilot signal port 18, the valve piston 20 will remain in its "in-service" position. Upon the interruption of pilot signal pressure to port 18 of the occurrence of a pre-determined minimum or drop in pilot signal pressure at port 18, the common supply pressure moves the piston member 20 to the "tripped" position, as shown in FIG. 2.

As the piston operating stem 54 with the pressure relief cutout 60 moves outwardly, the residual pressure contained in the central cylindrical bore 14 bleeds to the atmosphere. As shown in FIGS. 1 and 2, the cutout 60 is so designed that as piston member 20 moves down and as O-ring 50 moves across the pilot signal pressure port 18, the pressure relief cutout 60 causes O-ring 56 to unseat about the piston stem 54, allowing the residual pressure contained within the central cylindrical bore 14 to bleed to the atmosphere. With the piston 20 in its "tripped" position, as depicted in FIG. 2, the O-rings 46 and 50 seal across the pilot signal pressure port 18 rather than port 28, enabling the common supply bleed port 28 to bleed to the atmosphere.

As illustrated, the piston front surface 42 is necessarily larger than piston rear surface 44. However, with machined smooth mating surface 25 of inlet nipple 24 immediately adjacent piston front surface 42 when the piston is in the "in-service" position, the effective area of the piston front surface is reduced to that of the opening of common supply pressure port 26. In this position, the ratio of the area of piston rear surface 44 to the area of the pressure port opening 26 dictates the ratio of pilot signal pressure to common supply pressure that will cause the piston 20 to "trip." When piston 20 moves toward its "tripped" position only a slight amount, the effective area of piston front surface 42 is increased, thereby increasing the total force applied to "trip" the piston 20. In this manner, inlet members having smaller common supply port areas may be used to effect a "trip" upon the occurrence of only a slight pilot signal pressure interruption since only a very slight pressure interruption will move the piston, thereby increasing the effective area of, and pressure force upon, piston front surface 42. Likewise, inlet members having substantially larger common supply port areas may be used to effect a "trip" only upon the occurrence of a substantial pilot signal pressure drop because the increase of the effective area of piston front surface 42 would be negligible. In addition, it can be seen that interchangeable inlet members having a variety of common supply pressure port opening areas may be used with a variety of available pilot signal pressure and common supply pressure combinations to effect the desired "trip."

FIG. 3 illustrates a common application of the relay-/indicator valve 10. Continuous fluid pressure is supplied to the system at the supply inlet 110 of relay valve 100. With this continuous fluid pressure sufficient to maintain the relay valve 100 operational, the operator manually sets the relay valve, as with the knob 120, which permits this continuous supply inlet fluid pressure to pass through the relay valve at outlet 114 and continue through a restrictive orifice or choke 102 to the system of relay/indicator valves 10. This outlet signal at 114 is monitored by an appropriate means (not shown). On the outlet side of the choke 102 the supply inlet pressure is tapped and fed back into a control port 112 of the relay valve 100 in order that the supply inlet fluid pressure, acting at port 112 will maintain the relay valve 100 open, supplying pressure to each relay/indicator valve 10 and to the relay valve control port itself. In steady state condition, the fluid pressure at ports 112 and 114 remains constant. This pressure is then regulated by a pressure regulator 104 in order that the common supply pressure to the respective inlet ports 26 of the relay/indicator valves 10 remains constant.

In the typical operation of this system, this supply inlet fluid pressure is regulated to approximately 25 psi as it is supplied to each relay/indicator valve 10 at its respective common supply pressure port 26. In steady state condition, this supply inlet pressure maintains relay valve 100 in functional position in order to supply continuous regulated fluid pressure to each common supply pressure port 26 of each relay/indicator valve 10. As long as sufficient fluid pressure is maintained at the pilot signal port 18 of the valve 10, the piston 20 remains in its "in-service" position, as shown in FIG. 1. Upon an interruption of the pilot signal pressure, or upon the occurrence of a predetermined minimum pilot signal pressure, the regulated common supply pressure supplied to each relay/indicator valve port 26 moves the piston 20 from its "in service" position (FIG. 1) to its "tripped" (FIG. 2).

As best shown in FIG. 2, when the relay/indicator valve 10 is in its "tripped" position the pilot signal port 18 is closed and the stem 54 is extended from the valve 10 to visibly indicate the occurrence and location of an abnormal condition at a particular device monitored by the specific "tripped" relay/indicator valve. Also, with the valve 10 "tripped," common supply fluid at the relay/indicator valve port 26 passes freely through the central cylindrical bore 14 and out the bleed port 28 to atmosphere, causing the common supply pressure to suddenly drop. The sudden loss or drop of common supply pressure causes the supply inlet fluid to rush to the point of least resistance (the "tripped" relay/indicator valve common supply bleed port 28). This sudden on-rush of supply fluid from the relay valve 100 to the "tripped" relay/indicator valve 10 results in a pressure differential as the fluid passages through the choke 102, the magnitude of this differential being determined by the size of the choke orifice. This pressure differential drop across the choke 102 causes a relative drop in pressure at the control port 112 of the relay valve 100, which causes the relay valve to automatically block the supply inlet to fluid flow and bleed the residual common supply fluid to atmosphere via the "tripped" relay/indicator valve bleed port 28.

As may be seen in FIG. 2, a reinstatement of the pilot signal pressure alone has no effect on the operation of the relay/indicator valve 10. However, following a reinstatement of sufficient pilot signal pressure to port 18, the valve piston 20 may be manually repositioned from the "tripped" position to the "in-service" position by pressing on the operating stem member 54. At this point maintenance of the pilot signal pressure at port 18 will retain the piston member 20 in the "in-service" position. At this time, the relay valve 100 may be reset, reinstating the common supply pressure to each of the plurality of relay/indicator valves.

As may be seen in FIG. 1, an interruption of the common supply pressure will have no effect on any of the other relay/indicator valves 10 within the system. The relay/indicator valve 10 is designed to "trip" upon the occurrence of a pre-determined minimum pilot signal pressure, indicating which of a plurality of control points has encountered an abnormal condition, and allowing the common supply of pressure to freely bleed to the atmosphere, causing a second relay valve 100 to trip, terminating the supply inlet pressure to each of the relay/indicator valves 10. The "tripped" relay/indicator valve 10 indentifies the source of the abnormal condition and also shuts down the operation of the pneumatic system until the abnormal condition is corrected, the valve 10 is manually "reset" and the supply inlet pressure is reinstated from the second relay valve 100.

Thus, it is apparent that there has been provided in accordance with the invention, a relay/indicator valve that fully satisfies the aims and advantages set forth above. While the invention has been described in conjunction with specific embodiments thereof, it is evident that many alternatives, modifications and variations will be apparent to those skilled in the art in the light of the foregoing description. Accordingly, it is intended to embrace all such alternatives, modifications and variations as fall within the spirit and scope of the appended claims.

The invention having been described, what is claimed is:

1. A method of detecting and indicating pressure drops below a pre-determined minimum and automatically sealing the inlet port to said pressure source using a pneumatic control system comprising:
   (a) providing a relay valve for a common supply pressure;
   (b) regulating said common supply pressure with a pressure regulator;
   (c) positioning a choke between said relay valve and said pressure regulator;
   (d) inserting a plurality of valves below the choke wherein each of the valves is provided with:
      including a bore positioned within a valve body and having an outlet port communicating with the bore for exhausting the residual pressure from the body, a pilot signal inlet port for communicating with the bore for receiving pilot pressure within the body, a supply inlet port communicating with the bore for receiving a supply pressure within said body, a supply outlet communicating with said bore for exhausting the supply of fluid from said body
   (e) moveably mounting a piston within the bore;
   (f) machining on the piston a front surface with an area exposed to the supply pressure for exerting a first force from the supply pressure acting thereon and a rear surface with an area for receiving a second force from the pilot pressure acting thereon;
   (g) mounting a stem extending from said rear surface passing through the residual fluid outlet port;
   (h) enabling movement of the piston between first and second positions, providing the first position being where
      the piston body prevents passage of the supply fluid out the supply outlet port and the stem prevents passage of the pilot fluid out the residual fluid outlet port, and
      the providing second position being where
      the piston body prevents passage of the supply fluid out the pilot signal inlet port while permitting passage of the supply fluid out the supply outlet port and allowing passage of any residual pilot fluid out the residual fluid outlet port; and
   (i) maintaining a plurality of pilot signal pressures from each a respective different control points for providing pressure to one of each of said valve pilot signal ports;
   (j) providing a pre-determined regulated common supply inlet pressure acting on the piston front surface of each of the valves;
   (k) enabling one of each of plurality of pilot signal pressures to act on one of each of the plurality of respective piston rear surfaces of one of each of the plurality of valves;
   (l) enabling at least one of the pilot signal pressure ports mounted with one of the valve bodies to seal upon occurrence of a pre-determined minimum pilot signal pressure drop by moving the piston body;
   (m) enabling the common supply pressure associated with the valve having the moving piston to bleed to atmosphere through the common supply bleed port of the valve; and p1 (n) repositioning the moved piston upon a reinstatement of sufficient pilot signal pressure in the one valve.

2. A valve, comprising
(a) a valve body having
  i. a bore,
  ii. a port for providing residual pressure relief in communication wth said bore,
  iii. a pilot signal port communicating with said bore.
  iv. a common supply port communicating with said bore, and
  v. a common supply bleed port communicating with said bore; and
(b) a moveable piston positioned within said bore, said piston having
  i. front and rear surfaces exposed to said common supply port and said residual pressure relief port, respectively; said front surface being larger than said rear surface; and
  ii. a stem extending from said rear surface and sealably passing through said residual pressure relief port;
said piston member being moveable between a first position in which:
  i. said pilot signal port is exposed to said piston rear surface;
  ii. sad common supply bleed port is sealed by said piston body; and
  iii. said residual pressure relief port is sealed by said piston stem member;
and a second position in which:
  i. said pilot signal port is sealed by said piston body;
  ii. said common supply port communicates with said common supply bleed port; and
  iii. said residual pressure relief port is open;
wherein said piston member is maintained in said first position so long as a greater total pressure force is applied to said rear surface than the total pressure force that is applied to said front surface; and that a greater total pressure force applied to said front surface than that applied to said rear surface will cause said piston member to move from said first position to said second position.

3. A valve as in claim 2 wherein said stem projects outwardly from said valve body to permit a manual repositioning of said member from said second position to said first position.

4. A valve as in claim 2 wherein sufficient fluid pressure at said pilot signal port enables said piston member to be manually repositioned from said second position to said first position, and wherein sufficient fluid pressure at said pilot signal port maintains said piston member in said first position.

5. A pneumatic control system comprising:

(a) a relay valve providing a common supply pressure;
(b) a pressure regulator regulating said common supply pressure;
(c) a choke positioned between said relay valve and said pressure regulator;
(d) a plurality of valves each of which includes:
  i. a valve body having
    a. a bore,
    b. a port for providing residual pressure relief in communication with said bore,
    c. a pilot signal port communicating with said bore,
    d. a common supply port communicating with said bore, and
    e. a common supply bleed port communicating with said bore; and
  ii. a moveable piston positioned within said bore, said piston having
    a. front and rear surfaces exposed to said common supply port and said residual pressure relief port, respectively; said front surface being larger than said rear surface; and
    b. a stem extending from said rear surface and sealably passing through said residual pressure relief port;
  said piston member being moveable between a first position in which:
    a. said pilot signal port is exposed to said piston rear surface.
    b. said common supply bleed port is sealed by said piston body; and
    c. said residual pressure relief port is sealed by said piston stem member;
  and a second position in which:
    a. said pilot signal port is sealed by said piston body;
    b. said common supply port communicates with said common supply bleed port; and
    c. said residual pressure relief port is open;
  wherein said piston member is maintained in said first position so long as a greater total pressure force is applied to said rear surface than the total pressure force that is applied to said front surface; and that a greater total pressure force applied to said front surface than that applied to said rear surface will cause said piston member to move from said first position to said second position.
(e) a plurality of means one of each which is mounted with one of each of said valves for providing pilot signal pressures to said valve pilot signal ports.

6. The structure cast set forth in claim 5 including a means for preventing said system from operating if one of said piston members of one of said plurality of valves moves from said first to said second position.

* * * * *